F. B. SPRY.
EXPANDING AUGER.
APPLICATION FILED DEC. 30, 1921.
1,427,705.
Patented Aug. 29, 1922.
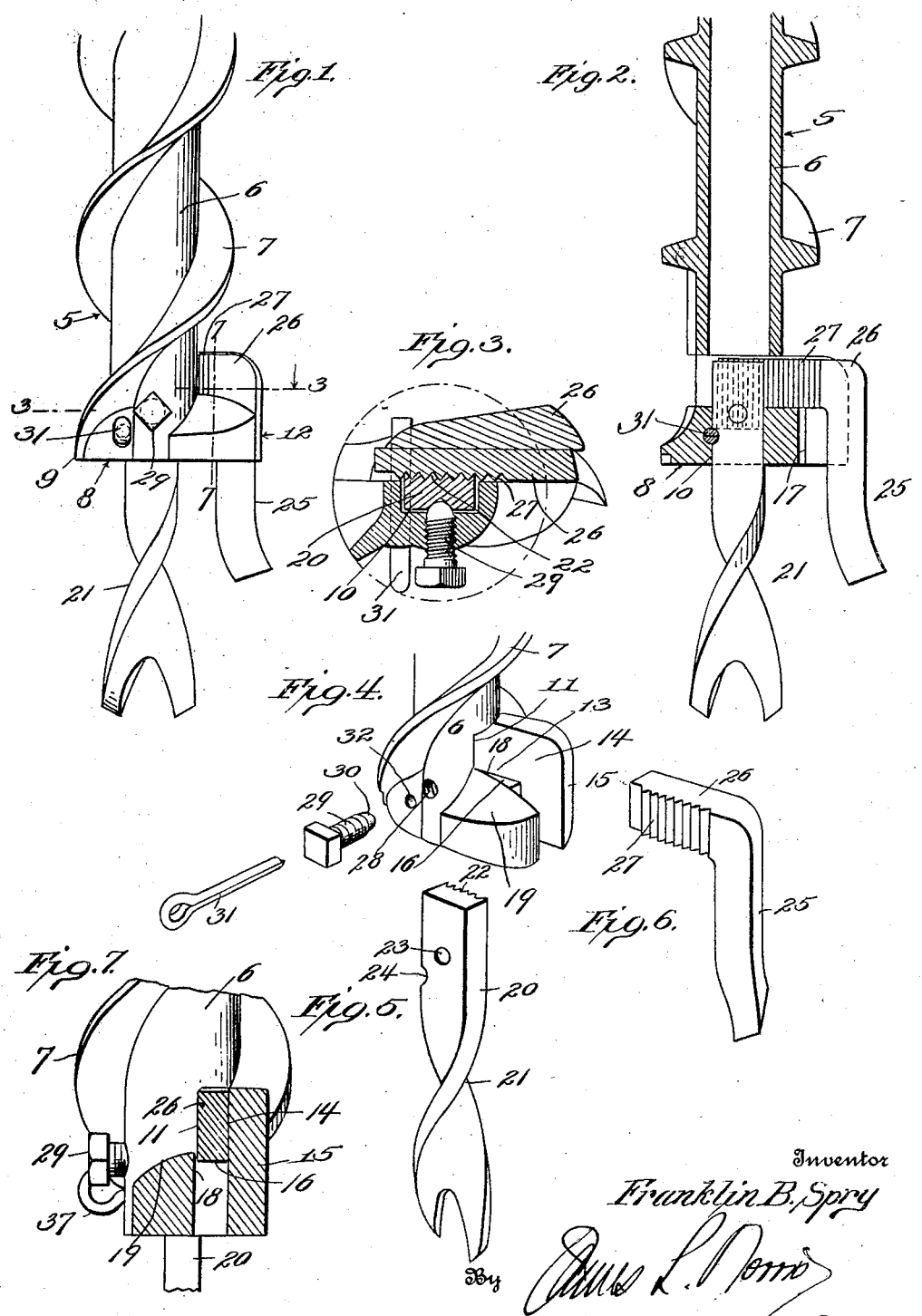
Inventor
Franklin B. Spry
By
Attorney

UNITED STATES PATENT OFFICE.

FRANKLIN B. SPRY, OF PLYMOUTH, PENNSYLVANIA.

EXPANDING AUGER.

1,427,705.    Specification of Letters Patent.    Patented Aug. 29, 1922.

Application filed December 30, 1921. Serial No. 525,866.

*To all whom it may concern:*

Be it known that I, FRANKLIN B. SPRY, a citizen of the United States, residing at Plymouth, in the county of Luzerne and State of Pennsylvania, have invented new and useful Improvements in Expanding Augers, of which the following is a specification.

This invention relates to improvements in expanding augers for boring or drilling holes of varying diameter or size.

The invention consists essentially in certain features of improvement of the structure disclosed by my Patent No. 627,659, dated June 27, 1899.

In addition to the objects of the invention as disclosed by the foregoing patent, and which consist among others in the ability of conveniently and expeditiously removing and replacing the screw tip or worm and the radially adjustable or expanding cutter, and the simplicity of adjustment of the said cutter to the desired position and firm securement thereafter, further objects consist in providing means for firmly and positively supporting the radially movable cutter to prevent the latter from breaking off when the cutting end thereof is turned backwardly, and also certain advantageous structural features hereinafter more particularly explained.

In the drawing:

Fig. 1 is an elevation of a portion of the improved expanding auger;

Fig. 2 is a longitudinal vertical section of the part of the auger shown by Fig. 1;

Fig. 3 is a horizontal section on the line 3—3, Fig. 1;

Fig. 4 is a detail perspective view of the attaching head of the auger together with the attaching devices removed and shown at one side thereof;

Figs. 5 and 6 are detail perspective views, respectively, of the screw tip or worm and the radially adjustable or expanding cutter;

Fig. 7 is a transverse section on the line 7—7, Fig. 1.

The numeral 5 designates the shank of the auger, which may be of any suitable length and preferably comprises a stem 6 with a spiral flange or thread 7 therearound and continuing fully to a bit-attaching head 8, the terminal of the flange or thread 7 being coincident with the end of the head 8, as at 9, and whereby the well known action or operation of the flange or thread 7 may be continued fully from the terminal of the head over the full length of the drill shank 5, to give a rapid clearance of the material cut during the boring action of the auger, and thus prevent choking or in anywise interfering with the effective cutting action of the bits. The head 8 is slightly flattened and approximately rectangular in form and has an angular socket 10 extending upwardly thereinto from the lower end, and also a lateral socket 11 intersecting the socket 10. The head 8 is projected a greater distance on one side of the socket 10 than on the opposite side, to provide an extension 12 in which the lateral socket 11 is formed and continues into an outer open portion 13 having a rear vertical smooth wall 14 which is the front side of a lateral flange 15, clearly shown by Fig. 4. The socket 11 extends fully through the head in the form of a slot, as illustrated by Figs. 2 and 3, and the bottom wall 16 of this slot extends outwardly over a portion of the width of the side wall 14 of the lateral flange 15 and then intersects a vertical wall 17 continuing downwardly coincident with the lower straight end 9 of the head, to thus provide an outwardly extending right angular abutment. In advance of the exterior portion of the lower wall 16 of the slot 11 is a front wall 18 of materially less vertical extent than the wall 14, but forming a substantial front bracing means as shown by Fig. 7. The metal from the upper terminal of the front wall 18 is cut away at a downward and outward angle to provide an inclined clearing face 19. This clearing face avoids the formation at this point of an obstructive abutment to the release of material loosened by the action of the drill bits, and encourages the free movement of the said loose material over the shank 5 and its flange or thread 7. This inclined face 19 has an approximate screw trend similar to the flange or thread 7 and at the same time the wall 18 is provided to form a very essential function in a manner which will be hereinafter explained. The flange 15 which has the greater vertical extent rises above the top limit of the head and its upper edge terminates coincident with the top wall of the slot 11, so that the rear bracing action of the front wall 14 of this flange is given as great surface contact as possible with the part which engages the said wall and held between the two walls 18 and 14.

Within the socket 10 the shank 20 of a screw tip or worm bit 21 is removably fitted. The shank 20 of the screw tip or worm bit 21 is formed with longitudinal corrugations 22, and in the other side is a socket 23, a groove 24 being formed transversely in one edge adjacent to the location of the socket 23. In the socket 11 a radially adjustable or expansible cutter 25 is inserted and has an upper laterally projecting arm 26 which is flattened and substantially rectangular and formed with a series of vertical corrugations 27 on one side to cooperate with, or have interfitting relation to, the corrugations 22 on the one side of the shank 20 of the screw tip or worm bit 21. The arm 26 is removably and adjustably inserted between the walls 14 and 18 and in the transverse socket 11, the socket 10 extending along the inner portion of one side of the socket 11 to provide for the adjustable engagement of the corrugations 22 and 27. When the arm 26 is inserted in the socket 11 it is braced by both walls 14 and 18, the greater bracing effect or resistance being provided by the wall 14. Extending transversely into the head 8 above the lower end of the latter is a screw opening 28 in which a clamping screw 29 is removably fitted, the end of said screw being reduced, as at 30, to engage the socket 23 of the shank 20 of the screw tip or worm bit 21. This clamping screw 29 insures a tight engagement of the corrugations 22 and 26 by exerting a pressure on the outer side of the shank 20 of the screw tip or bit 21, and to prevent longitudinal displacement of the said screw tip or bit, a spring or cotter pin 31 is inserted through an opening 32 extending fully through the head, the said pin 31 engaging the groove 24 of the shank 20 of the screw tip or bit 21. It will be understood of course that the clamping screw 29 also has a secondary function in that it assists in holding the shank 20 of the screw tip or bit 21 against longitudinal displacement in addition to the securement of the cotter pin 31. The clamping screw 29 may be readily loosened and the cotter pin 31 withdrawn to modify the adjustment of the cutter 25, and after adjustment is made, the said cutter will be held against movement or displacement relatively to the head. The fastening devices just explained also operate to keep both cutting bits firm after they have become worn through constant use and particularly the clamping screw 29, the cotter pin 31 only preventing the main bit 21 from falling out of its socket 10. The front wall 18 forms a guard lip which keeps the cutting bit 25 from breaking off when the cutting head is turned rearwardly or in a direction reverse to the direction of cutting actuation thereof. Without this bracing or guard lip 18, the arm 26 would be liable to break when a backward movement is given the auger at about the first corrugation, but by the use of the guard lip this disadvantage will be removed. The greatest strain on the bit 25 is imposed when the auger is turned in a cutting direction, and at such time the arm 26 and a part of the shank of the bit 25 are braced against the wall 14 above the angular base wall 16 and below the outer end of the latter. These specific features are all of material importance in contributing to the strength and durability of the improved auger.

It will be understood that it is proposed to attach the head and a portion of the screw flange and shank thereabove to a longer part of the shank, or to make the latter in sections, and whereby the head with the bits may be readily detached from the main body of the shank 5 and easily attached thereto and any length of the shank 5 applied to the improved head.

What is claimed as new is:

1. In an auger of the class specified, a stem having a head with a lateral projection and a spiral flange extending the full length thereof and terminating coincidently with the head end, the head having a straight socket and the lateral projection and head also having a lateral socket intersecting the straight socket at right angles and partially formed exteriorly of the stem in the said projection, the exterior part of the socket having a rear bracing wall of considerable vertical extent and a front shorter bracing wall, a main screw bit with a straight shank removably fitted in the straight socket, an expansible cutter having a right angular arm removably fitted in the lateral socket, the shank of the screw bit and the arm of the expansible cutter having interfitting corrugations for adjustment of the said cutter, and means for securing the bits against movement in the head.

2. In an auger of the class specified, a stem having a head with a lateral projection and straight and lateral sockets, the lateral socket entering the stem at a point distant from the end of the head and at right angles to the straight socket and partially formed in the said lateral projection, the part of the lateral socket in the projection being defined between a rear vertical wall and a front shorter wall, a main screw bit having a shank removably fitted in the straight socket, an expansible cutter having a right angular arm adjustably and removably fitted in the lateral socket, the shank of the screw bit and the arm having interfitting corrugations for adjustment of the expansible cutter, a securing device extending through the head and engaging the one side edge of the main screw bit, and a clamping fastening means extending into and engaging the shank of the main screw bit and forcing the corrugations of the latter into engagement with the corrugations of the arm and adjustable to take up wear of the shank and arm.

3. In an auger of the class specified, a stem having a screw flange and a head with a straight end, the head being formed with a straight socket and a laterally projecting socket entering one side of the stem in a plane at right angles to the straight socket, a main screw bit having a straight shank removably fitted in the straight socket, an expansible cutter having a right angular arm removably and adjustably fitted in the lateral socket, the head having bracing means engaging the front and rear sides of the arm and a portion of the shank of the expansible cutter, a removable fastening means extending transversely through the head and engaging one edge of the stem of the main bit, and an adjustable fastening means extending into the head and engaging the adjacent side of the shank of the main bit, the upper portion of the shank of the main bit and the adjacent side of the arm of the expansible cutter having interfitting corrugations which are held in positive engagement by the fastening means.

In testimony whereof I have hereunto set my hand in presence of two subscribing witnesses.

FRANKLIN B. SPRY.

Witnesses:
CHARLES L. ASHLEY,
HARRY ARCHEY.